(12) United States Patent
Bruhn et al.

(10) Patent No.: US 7,256,583 B2
(45) Date of Patent: Aug. 14, 2007

(54) DEVICE AND METHOD FOR TESTING THE SEAL TIGHTNESS OF A FUEL TANK SYSTEM OF A MOTOR VEHICLE

(75) Inventors: Andreas Bruhn, Puchheim (DE); Josef Lutz, Munich (DE); Ralf Widmann, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 19 days.

(21) Appl. No.: 11/349,260

(22) Filed: Feb. 8, 2006

(65) Prior Publication Data

US 2006/0176058 A1    Aug. 10, 2006

(30) Foreign Application Priority Data

Feb. 8, 2005   (DE) .................. 10 2005 005 685

(51) Int. Cl.
*G01R 31/02* (2006.01)
(52) U.S. Cl. .................. 324/415; 123/198 D
(58) Field of Classification Search ............. 324/713, 324/761, 45; 123/198 D
See application file for complete search history.

(56) References Cited

U.S. PATENT DOCUMENTS

| | | | |
|---|---|---|---|
| 5,467,641 A | 11/1995 | Williams et al. | |
| 5,675,073 A | 10/1997 | Otsuka | |
| 5,911,209 A | 6/1999 | Kouda et al. | |
| 2003/0037599 A1 | 2/2003 | Penschuck et al. | |
| 2003/0102976 A1* | 6/2003 | Lavallee | 340/687 |

FOREIGN PATENT DOCUMENTS

| | | |
|---|---|---|
| DE | 195 02 775 C1 | 6/1996 |
| DE | 198 09 384 C2 | 9/1999 |
| DE | 198 36 295 B4 | 2/2000 |

OTHER PUBLICATIONS

German Search Report for 10 2005 005 685.7 dated Sep. 19, 2005.

* cited by examiner

*Primary Examiner*—Walter Benson
(74) *Attorney, Agent, or Firm*—Crowell & Moring LLP

(57) ABSTRACT

A device and method for testing seal tightness of a fuel tank system of a motor vehicle, wherein excess pressure is built up in the fuel tank system by an electrically operated pump and electric current consumption of the pump is compared to reference values in order to determine whether the seal tightness of the fuel tank system is sufficient, and wherein the fuel tank system includes a filler neck with a locking fuel tank cap. A control line is connected in parallel to the power supply line of the pump, the control line being guided across an electric tank cap switch, which assumes a different switch state when the filler neck is closed properly than when it is not closed properly. In at least one of these lines, an electric resistor is installed, which allows a determination of the switch state of the tank cap switch.

10 Claims, 3 Drawing Sheets

DEVICE AND METHOD FOR TESTING THE SEAL TIGHTNESS OF A FUEL TANK SYSTEM OF A MOTOR VEHICLE

BACKGROUND AND SUMMARY OF THE INVENTION

The present invention relates to a device and a method for testing the seal tightness of a fuel tank system of a motor vehicle. More particularly, the present invention relates to a device and method in which excess pressure (or low pressure) is created in the tank system by an electrically operated pump, the electric current consumption of the pump is compared to reference values in order to determine whether the seal tightness of the tank system is sufficient, and the tank system includes a filler neck that can be closed with a fuel tank cap. By way of example, reference is made to the prior state of the art such as DE 195 02 775 C1.

As is generally known, in some countries legal regulations are in place, according to which the fuel tank system of motor vehicles must be checked onboard for tightness on a regular basis. Mostly after turning off the vehicle, a certain excess pressure is created in the fuel tank by means of an electrically operated air pump and the required electric current is measured. The pump or the measurement instrument is calibrated prior to the measurement, based on the current consumption that is experienced when guiding a reference leakage current through an air outlet opening that has been standardized in terms of its size. If, during the proper measuring process, the electric current consumption is within a certain range of values, the conclusion can be drawn that the tank system is adequately tight. If, however, the electric current consumption is noticeably lower, this is an indication of leakage in the tank system.

Leakage is also detected with the measurement instrument in cases in which an ordinary fuel tank cap closing the typical filler neck is not properly attached or screwed on, and, therefore, the filler neck is not properly closed. Although simple manual tightening would suffice to correct this problem, typically, a warning signal is activated, which requires the driver of the vehicle to visit the closest automotive repair shop in order to have the problem of the alleged leaking tank system corrected.

In order to remedy the above-described problem, an electric switch can be provided on, or working with, the fuel tank cap. Based on the state of the switch, a conclusion may be drawn as to whether the filler neck is closed properly or is at least partly open. Using an electronic control unit, with which the entire tightness test is controlled, would then allow the respective signal of this fuel tank cap switch to be suitably considered and the vehicle driver to be informed accordingly. Alternatively, the vehicle driver can be alerted to the fact that the fuel tank cap has not been closed properly, and, therefore, the filler neck is not closed completely. However, in order to implement this possible solution, an electric signal line leading from the tank cap or, more precisely, from the tank cap switch to this electronic control unit is required, as well as a corresponding input for the electric signal line on the control unit.

Since this is relatively expensive to do, the present invention provides a simplified device and a corresponding method for testing the seal tightness of a fuel tank system of a motor vehicle, wherein, by means of an electrically operated pump, excess pressure is built up in the tank system and the electric current consumption of the pump is compared to reference values in order to determine whether the tightness of the tank system is sufficient, and wherein the tank system includes a filler neck with a locking fuel tank cap.

In exemplary embodiments of the present invention, a control line is connected in parallel to the power supply line of the pump, the line being guided across an electric tank cap switch, which assumes a different switch position when the filler neck is closed properly than when the filler neck is not closed properly. In at least one of these lines, an electric resistor is installed such that, when the filler neck is not closed properly and the pump is set in operation, an electric current develops in the two lines, which allows a conclusion to be drawn on the respective switch state of the tank cap switch.

Using this suggestion, the electric current conducted to the pump, or, more precisely, to the electric driving motor thereof, is modified as a function of the switch state, where applicable. Specifically, in the case of suitable selection of the aforementioned electric resistor, the current flow, which can be detected or measured when the filler neck has not been closed properly, is outside the current value range typically consumed by the pump or the driving motor thereof.

Other objects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
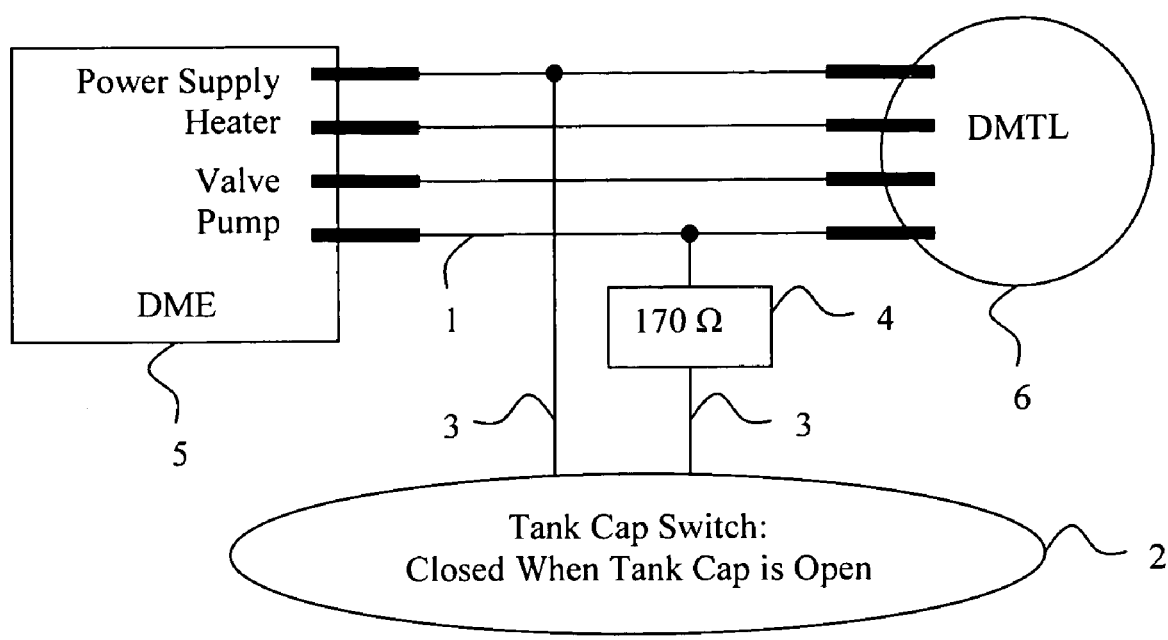
FIG. 1 illustrates an exemplary embodiment of an electric circuit for testing the seal tightness of a fuel tank system of a motor vehicle, in accordance with the present invention.
Figure 2:
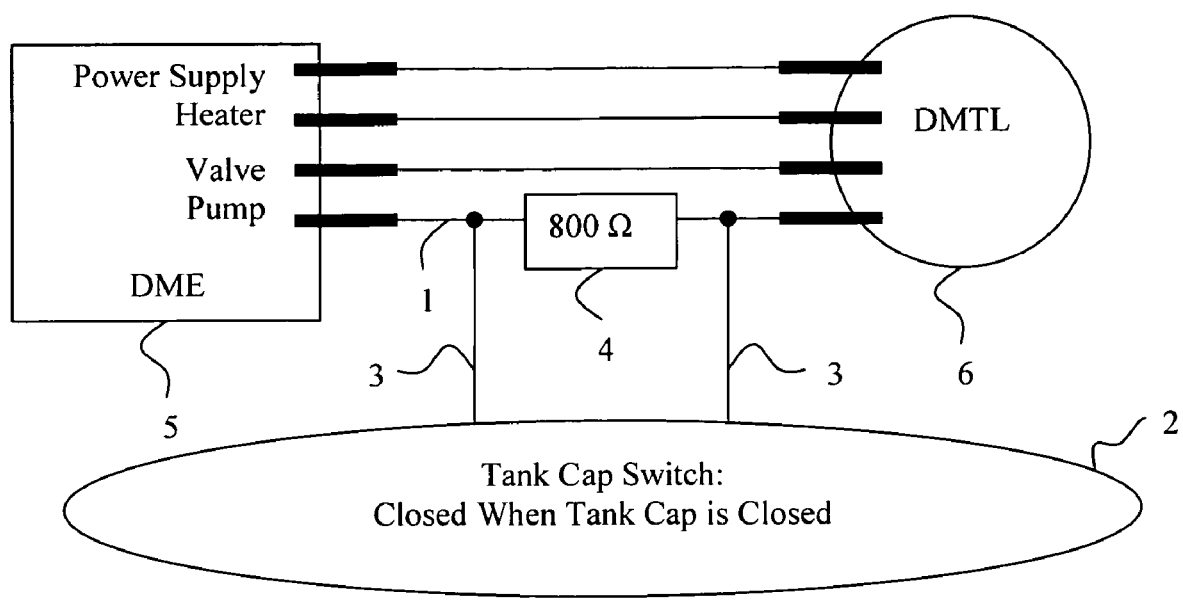
FIG. 2 illustrates another exemplary embodiment of an electric circuit for testing the seal tightness of a fuel tank system of a motor vehicle, in accordance with the present invention.

Two exemplary electric circuits in accordance with the present invention are illustrated in FIGS. 1 and 2, which will be explained in more detail hereinafter. In both examples, "DMTL" designates the above-mentioned electronic control unit, which allows the entire leakage test of the vehicle tank system to be controlled, and which may also be referred to as "diagnosis module tank leakage." The DMTL 6 is connected by means of electric control and supply lines to the central electronic control unit for the drive unit of the motor vehicle, which is referred to as "DME" (digital motor electronics) 5. The upper-most electric connection line in the figures serves the power supply of the DMTL 6. By means of the second and third control lines, respectively, a heater and a valve may be controlled, which is not required to provide an understanding of the invention. The bottom-most (fourth) power supply line, having the reference numeral 1, may be controlled by means of the aforementioned pump or its electric driving motor.

Both embodiments furthermore comprise a so-called tank cap switch (reference numeral 2), the switch state of which is dependent upon whether the tank filler neck has been closed properly by the tank cap or is at least partially open.

Electric control lines 3, which are suitably (and differently for the two embodiments) connected to the aforementioned electric lines between the DME and the DMTL, are guided across the tank cap switch 2. Moreover, (differently for the two embodiments) a suitable resistance element, for example, electric resistor 4, is provided in the circuit, which is explained hereinafter with reference to the figures. Other resistance elements may be used instead of the resistor 4, which is merely exemplary.

In the embodiment according to FIG. 1, the tank cap switch 2 is closed with the filler neck not being properly closed, and the electric resistor 4 is provided in the control line 3, which is connected in parallel to the electric power supply, branching to the power supply line 1 and connecting to it. When the tank filler neck is closed properly, and hence the tank cap switch 2 is open, the usual conditions exist, i.e., during operation of the pump, only the electric current used by the driving motor of the pump is measured, and the leakage test can be performed as usual. If, however, the tank filler neck is not closed properly and the tank cap switch 2 is therefore closed, during operation of the pump, additional electric current apart from the electric current consumed by the driving motor of the pump flows through the resistor 4. Both currents are recognized jointly by the DMTL, whereby the resistor 4 having 170 ohms, for example, is designed to ensure that such a high current flow is detected that cannot be used solely by the pump's driving motor. Hence, this detected high electric current is an indication that the tank filler neck is at least partially open.

In the embodiment according to FIG. 2, the tank cap switch 2 is closed with the filler neck being properly closed, and the electric resistor 4 is provided in the power supply line 1 of the aforementioned pump's driving motor. The control lines 3 leading across the tank cap switch 2 to the power supply line 1 are connected in parallel, wherein, in the latter, the aforementioned electric resistor 4 is provided between the two branching points of the control lines 3. When the tank filler neck is closed properly, and hence the tank cap switch 2 is closed, nearly the usual conditions exist, i.e., during operation of the pump, only the electric current used by the driving motor of the pump is measured, which flows essentially without additional leakage via the control line 3, so that the leakage test can be performed as usual. If, however, the tank filler neck is not closed properly, and thus the tank cap switch 2 is open, during operation of the pump the electric current consumed by the driving motor of the pump flows completely through the electric resistor 4, which at 800 ohms, for example, has relatively high resistance, thus reducing the current flow so significantly that it cannot be attributed solely to the pump's driving motor. This significantly low electric current is an indication that the tank filler neck is at least partially open.

Through a corresponding change in the logic of the electronic control unit DMTL 6, in conjunction with a tank cap switch 2 and a control line 3, an improperly closed tank filler neck can be easily detected.

Figure 3:
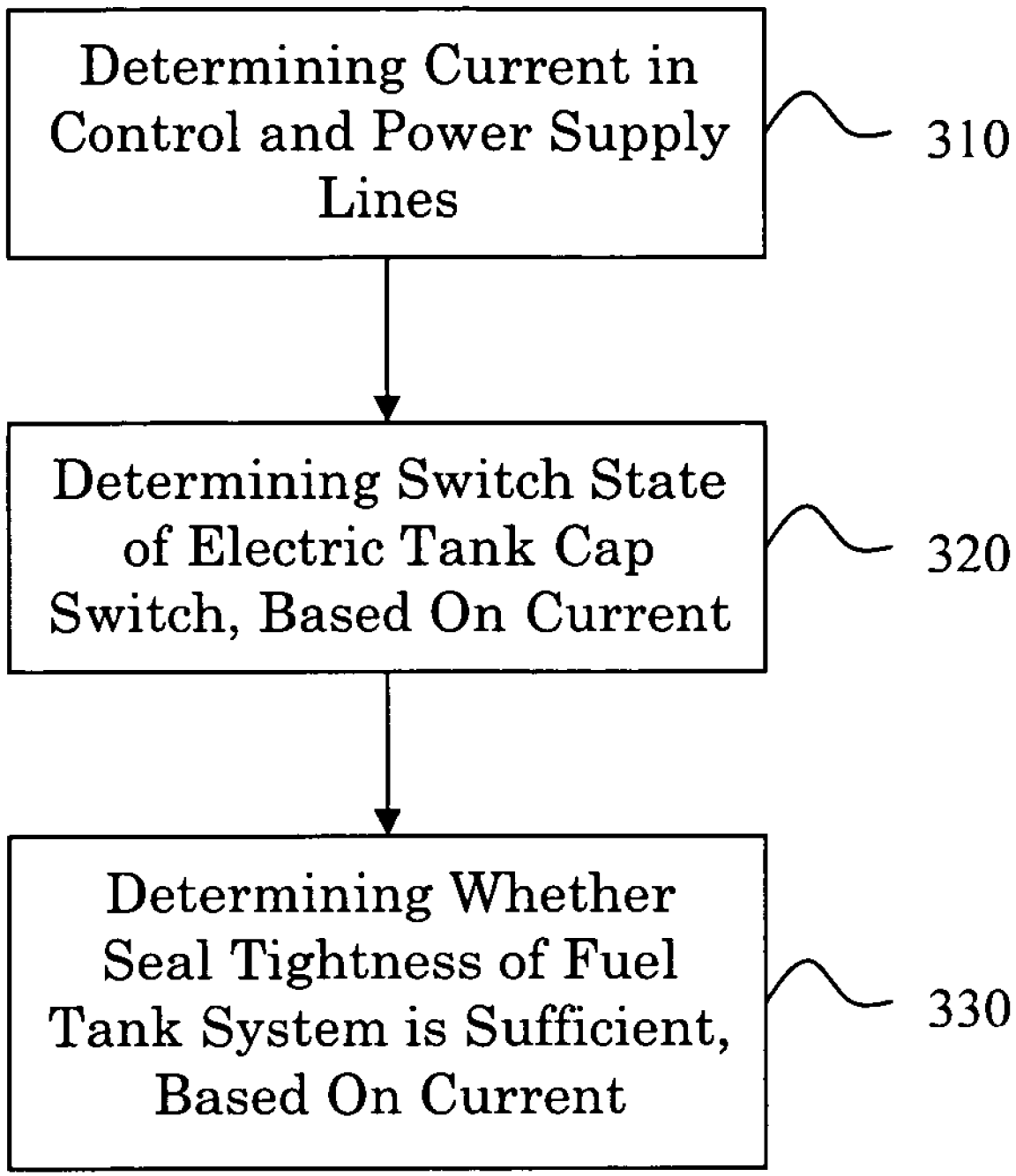
FIG. 3 illustrates an exemplary method for testing the seal tightness of a fuel tank system of a motor vehicle, in accordance with the present invention.

FIG. 3 illustrates an exemplary method for testing the seal tightness of a fuel tank system of a motor vehicle, in accordance with the present invention. In step 310 of the exemplary method, the current in the control and power supply lines is determined. In step 320, the state of the tank cap switch is determined, based on the current. As described above, whether the tank filler neck is open or closed determines the state of the tank cap switch. This is the case, because the current in the control and power supply lines depends upon the state of the tank cap switch. Since the current depends on the state of the tank cap switch, the current can be used to determine the seal tightness of the fuel tank system, as illustrated in step 330. For example, the current may be compared to reference values to determine the seal tightness of the fuel tank system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for testing seal tightness of a fuel tank system of a motor vehicle, wherein excess pressure is built up in the fuel tank system by an electrically operated pump and electric current consumption of the pump is compared to reference values in order to determine whether the seal tightness of the fuel tank system is sufficient, and wherein the fuel tank system comprises a filler neck with a locking fuel tank cap, the device comprising:

a control line connected in parallel to a power supply line of the pump, the control line being guided across an electric tank cap switch, which has a different switch state when the filler neck is closed properly than when it is not closed properly; and an electric resistor installed in at least one of the control line and the power supply line;

wherein, in the control and power supply lines an electric current develops, when the filler neck is not closed properly during operation of the pump, which allows a determination of the switch state of the tank cap switch.

2. A device according to claim 1, wherein the tank cap switch is closed when the filler neck is not closed properly and the electric resistor is provided in the control line.

3. A device according to claim 1, wherein the tank cap switch is closed when the filler neck is closed properly and the electric resistor is provided in the power supply line.

4. A method for testing seal tightness of a fuel tank system of a motor vehicle, wherein excess pressure is built up in the fuel tank system by an electrically operated pump and electric current consumption of the pump is compared to reference values to determine whether the seal tightness of the fuel tank system is sufficient, and wherein the fuel tank system comprises a filler neck with a locking fuel tank cap, the method comprising the act of:

determining a switch state of an electric tank cap switch, based upon an electric current;

wherein the electric tank cap switch has a different switch state when the filler neck is closed properly than when the filler neck is not closed properly;

wherein a control line connected in parallel to a power supply line of the pump is guided across the electric tank cap switch; and wherein, in at least one of the control line and the power supply line, an electric resistor is installed, and in the control and power supply lines the electric current develops when the filler neck is not closed properly during operation of the pump.

5. A method according to claim 4, wherein the tank cap switch is closed when the filler neck is not closed properly and the electric resistor is provided in the control line.

6. A method according to claim 4, wherein the tank cap switch is closed when the filler neck is closed properly and the electric resistor is provided in the power supply line.

7. A method for testing seal tightness of a fuel tank system of a motor vehicle, comprising the acts of:
- determining the seal tightness of the fuel tank system, based upon an amount of current;
- wherein the amount of current depends upon a switch state of an electronic tank cap switch; and
- wherein the tank cap switch is closed when a filler neck of the fuel tank system is not closed properly and a resistance element is provided in a control line of the tank cap switch.

8. The method of claim 7, wherein the electric tank cap switch has a different switch state when the filler neck is closed properly than when the filler neck is not closed properly.

9. The method of claim 7, wherein the amount of current is compared to a reference value to determine the seal tightness of the fuel tank system.

10. A method for testing seal tightness of a fuel tank system of a motor vehicle, comprising the acts of:
- determining the seal tightness of the fuel tank system, based upon an amount of current;
- wherein the amount of current depends upon a switch state of an electronic tank cap switch; and
- wherein the tank cap switch is closed when the filler neck is closed properly and a resistance element is provided in parallel with the tank cap switch.

* * * * *